Aug. 25, 1925.
L. E. STRIBLING
AUTOMOBILE SPRING
Filed July 2, 1924
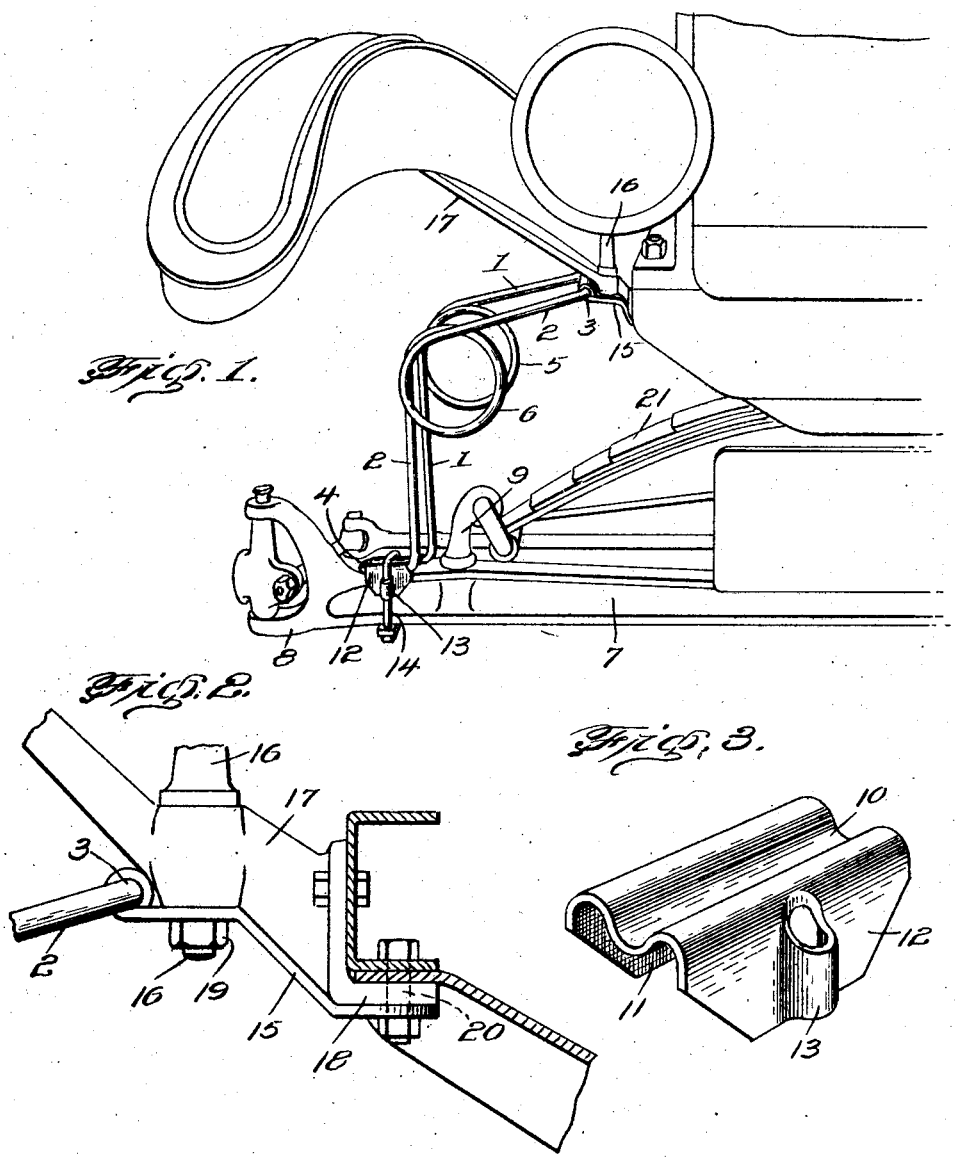
Inventor
L. E. Stribling.
By Townshend & Townshend
Attorney Patented Aug. 25, 1925.

1,551,343

UNITED STATES PATENT OFFICE.

LUTHER E. STRIBLING, OF PHILADELPHIA, MISSISSIPPI.

AUTOMOBILE SPRING.

Application filed July 2, 1924. Serial No. 723,719.

*To all whom it may concern:*

Be it known that I, LUTHER E. STRIBLING, a citizen of the United States, residing at Philadelphia, in the county of Neshoba and State of Mississippi, have invented certain new and useful Improvements in Automobile Springs, of which the following is a specification.

My invention relates to automobile appliances and especially to spring shock absorbing and preventing devices. The primary object of the invention is to provide a spring means for taking up side-sway of an automobile frame relative to the axle, and lessen road shock. A further object of the invention is the provision of springs adapted to supplement the front spring of an automobile, and arranged to prevent shearing at the spring shackle bolts.

With these, and such other objects in view as will be apparent from the description, the invention resides in the novel construction, combination and arrangement of parts hereinafter described and claimed, and illustrated in the accompanying drawings, of which:

Figure 1 is a front elevation of an automobile equipped with a spring in accordance with the invention, Figure 2, a fragmentary elevation, partly in section, of the spring mounting adjacent a lamp spindle, and Figure 3, a perspective of a clamping plate employed over a portion of the front axle.

As illustrated, the details of the invention comprise a spring member formed of a single strand of heavy spring wire bent upon itself to form parallel arms 1 and 2 spaced by transverse end shanks 3 and 4. In the preferred form the ends of the wire are united to provide a unitary structure.

Intermediate the end shanks 3 and 4, each arm is centrally looped upon itself to provide spring bows 5 and 6, with the arms extending from the loops in angled relation as shown in Figure 1. At a point adjacent one end shank, as 4, the arms 1 and 2 are bent to extend for a short distance at right angles to their major portions, forming a section adapted to rest over the top of the front axle 7 of an automobile, between the steering fork 8 and front spring spindle 9. This section is clamped in position upon the axle by means of a clamping plate having a fluted top 10 and depending side flanges 11 and 12, which flanges are adapted to engage the sides of the axle and are provided with sockets, one of which is shown as at 13, formed therein by laterally bowing the faces of the flanges, for reception of a U bolt 14. The fluted top of the clamping plate 10 engages over the underlying portions of the arms 1 and 2, effectively to retain the spring in position.

Hingedly connected over the opposite end shank 3 of the spring, is a plate 15, angled throughout its length to engage under the front lamp spindle 16, fender brace 17 and its frame attaching bracket 18. The plate 15 is secured in position by means of the lamp spindle nut 19, the spindle being passed through the plate for this purpose, and also by the frame bolt 20.

By this arrangement of parts, the spring member will be mounted to extend between the front axle and lamp spindle mounting, over and at one end of the front spring 21 of the automobile. Although only one of the spring members is shown, it is to be understood that a similar member is disposed in like manner at the opposite side of the automobile.

The invention is peculiarly adapted, and in this embodiment, expressly formed, for use on cars of the Ford type. The disposition of a spring at each side of the machine, serves to cushion the side-sway, take up road shock, and ease the shearing strain on the front spring shackle bolt. The bows 5 and 6 of the spring members are so disposed that they will act to vertical as well as lateral forces, insuring an efficient supplement to the front spring.

While I have illustrated and described certain details entering into the construction of the preferred embodiment of the invention, as shown, I desire it to be understood that the invention is not limited thereto, but that any desired changes and modifications may be made in the structural details thereof, as will fall within the scope of the invention as claimed.

I claim:—

1. The combination of an automobile having a spring mounted body supported substantially centrally of the front axle, of supplemental hinge like spring members disposed adjacent the sides of the body and above the front axle, and the terminals of said spring members being rigidly connected to the axle and hingedly connected to the sides of the body respectively whereby excessive side sway of the body is prevented.

2. The combination of an automobile having a spring mounted body supported substantially centrally of the front axle, of looped spring members disposed adjacent the sides of the body and above the front axle, angularly extending arms on said spring members, and one of the arms of each spring member being rigidly connected to the front axle and the other hingedly connected to the sides of the body whereby excessive side sway of the body is prevented.

3. The combination with an automobile, of a loop spring disposed adjacent the side of the body of the automobile and above the front axle, downwardly and laterally extending terminal arms of said spring, means for rigidly clamping the terminal of the downwardly extending arm to the front axle of the automobile, and means for hingedly connecting the terminal of the laterally extending arm to the side of the body of said automobile.

4. The combination with a looped spring for automobiles adapted to be mounted between the front axle and front lamp spindle, of a fluted plate adapted to be engaged over the front axle with a portion of the spring between the plate and axle, side flanges on said plate, sockets formed in said flanges, and a U bolt adapted to be disposed in said sockets for clamping said plate and spring to the axle.

In testimony whereof I affix my signature.

LUTHER E. STRIBLING.